United States Patent
Ikegami et al.

(10) Patent No.: US 6,918,266 B2
(45) Date of Patent: Jul. 19, 2005

(54) EJECTOR FOR VAPOR-COMPRESSION REFRIGERANT CYCLE

(75) Inventors: Makoto Ikegami, Anjo (JP); Haruyuki Nishijima, Nagoya (JP); Tooru Ikemoto, Chiryu (JP); Yukio Ogawa, Nishio (JP); Hisatsugu Matsunaga, Anjo (JP); Takeharu Asaoka, Toyota (JP); Hirotsugu Takeuchi, Nagoya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/826,203

(22) Filed: Apr. 16, 2004

(65) Prior Publication Data

US 2004/0206111 A1  Oct. 21, 2004

(30) Foreign Application Priority Data

Apr. 21, 2003  (JP) ........................................ 2003-115790

(51) Int. Cl.[7] .................................................. F25B 1/06
(52) U.S. Cl. ............................. 62/500; 62/191; 62/512
(58) Field of Search ........................... 62/500, 512, 503, 62/471, 191, 175

(56) References Cited

U.S. PATENT DOCUMENTS 6,477,857 B2 * 11/2002 Takeuchi et al. .............. 62/500
6,574,987 B2 * 6/2003 Takeuchi et al. .............. 62/500
6,604,379 B2 * 8/2003 Hotta et al. .................... 62/500

FOREIGN PATENT DOCUMENTS

| JP | 10-205898 | 8/1998 |
| JP | 2003-97499 | 4/2003 |
| JP | 2003-336915 | 11/2003 |

* cited by examiner

Primary Examiner—Melvin Jones
(74) Attorney, Agent, or Firm—Harness, Dickey & Pierce, PLC

(57) ABSTRACT

In an ejector, a nozzle is provided within a housing to defining a passage portion around the nozzle, and a suction port is provided in the housing to draw a refrigerant by entrainment of a driving refrigerant jetted from the nozzle. Further, a wall portion is provided in the housing such that the refrigerant drawn from the suction port into the passage portion is prevented from flowing toward an inlet side of the nozzle from a position of the suction port in an axial direction of the nozzle. Therefore, all of the refrigerant flowing from the suction port flows toward an outlet side of the nozzle without flowing toward the inlet side of the nozzle from the position of the suction port in the axial direction. Thus, it can prevent a large pressure loss from being caused in the refrigerant sucked from the suction port, and ejector efficiency can be effectively increased.

9 Claims, 8 Drawing Sheets

EJECTOR FOR VAPOR-COMPRESSION REFRIGERANT CYCLE

CROSS-REFERENCE TO RELATED APPLICATION

This application is related to and claims priority from Japanese Patent Application No. 2003-115790 filed on Apr. 21, 2003, the contents of which are hereby incorporated by reference.

BACKGROUND OF THE INVENTION

1. Field of the Invention

The present invention relates to an ejector which is a kinetic pump for transferring a fluid by using entrainment of a high-speed jet flow of a driving fluid. The ejector is suitably used for a vapor compression refrigerant cycle (ejector cycle) where the ejector is used as a pumping unit for circulating refrigerant (JIS Z 8126 2.1.2.3).

2. Description of Related Art

In an ejector cycle described in JP-A-10-205898, high-pressure refrigerant is decompressed and expanded in a nozzle of an ejector, and a low-pressure refrigerant in the evaporator is circulated by the pumping function of the nozzle of the ejector. Further, in the ejector cycle, a pressure of refrigerant to be sucked into a compressor is increased by converting expansion energy of refrigerant to pressure energy thereof, so that consumption power of the compressor is reduced.

In this ejector cycle, as an energy converting efficiency in the ejector, that is, an ejector efficiency becomes lower, the pressure of refrigerant to be sucked to the compressor cannot be sufficiently increased. In this case, the consumption power of the compressor is not sufficiently reduced, and a necessary amount of refrigerant may be not circulated to the evaporator.

Further, in the ejector cycle described in JP-A-10-205898, a part of refrigerant sucked from the evaporator through a suction port of the ejector flows toward a refrigerant inlet side of the nozzle, opposite to a refrigerant outlet side of the nozzle, and is turned by 108° due to collision with a wall, so as to flow toward the refrigerant outlet side. Thus, the refrigerant sucked from the suction port of the ejector has a large pressure loss. As a result, it is difficult to effectively increase the ejector efficiency.

SUMMARY OF THE INVENTION

In view of the above-described problems of the present invention, it is an object of the present invention to provide an ejector, which effectively increases the ejector efficiency by reducing pressure loss generated in a suction fluid.

According to an aspect of the present invention, an ejector includes a nozzle in which a driving fluid flow is throttled and is accelerated by converting pressure energy to speed energy, and a housing which receives the nozzle to define a passage portion around the nozzle. The housing has a suction port from which a fluid is sucked by entrainment of a high-speed flow of driving fluid jetted from the nozzle, and a pressure increasing portion in which the fluid sucked from the suction port and the driving fluid jetted from the nozzle are mixed while a pressure of the fluid is increased by converting the speed energy to the pressure energy. In the ejector, a wall portion is provided in the housing to prevent the fluid drawn from the suction port into the passage portion from flowing toward an inlet side of the nozzle from a position of the suction port in an axial direction of the nozzle. Further, the housing has an inner wall surface for defining the suction port, and a part of the inner wall surface is positioned in the same surface as an end portion of the wall portion. Thus, all of the suction fluid from the suction port flows toward an outlet side of the nozzle without flowing toward the inlet side of the nozzle. Accordingly, it can prevent a large pressure loss from being generated in the suction fluid introduced from the suction port, and an ejector efficiency can be effectively improved.

Preferably, the suction port is opened in a direction crossing with an axial direction of the nozzle, and the wall portion is tilted with respect to the axial direction such that a flow of the fluid flowing into the passage portion from the suction port is turned toward the outlet side of the nozzle. In this case, it is possible to smoothly turn the suction fluid from the suction port toward the outlet side of the nozzle, and the pressure loss generated in the suction fluid can be effectively restricted. For example, the suction port is opened in a direction substantially perpendicular to the axial direction of the nozzle.

According to another aspect of the present invention, the suction port is opened to have an axis that is substantially parallel with a direction perpendicular to an axis of the nozzle, and the axis of the suction port is offset from the axis of the nozzle. In this case, it can prevent the fluid flowing from the suction port from colliding with an outer peripheral surface of the nozzle. Therefore, it can further restrict the pressure loss from being generated in the suction fluid.

According to a further another aspect of the present invention, the suction port and the passage portion are set in such a manner that a ratio of a passage sectional area (B) of the passage portion to a passage sectional area (A) of the suction port is in a range between 1 and 2. For example, when the ejector is used for a vapor-compression refrigerant cycle where R404A is used as the refrigerant, the ejector efficiency can be effectively improved.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the appended drawings.

(First Embodiment)

In the first embodiment, an ejector cycle (vapor-compression refrigerant cycle) according to the present invention is typically used for a vehicle air conditioner.

Figure 1:
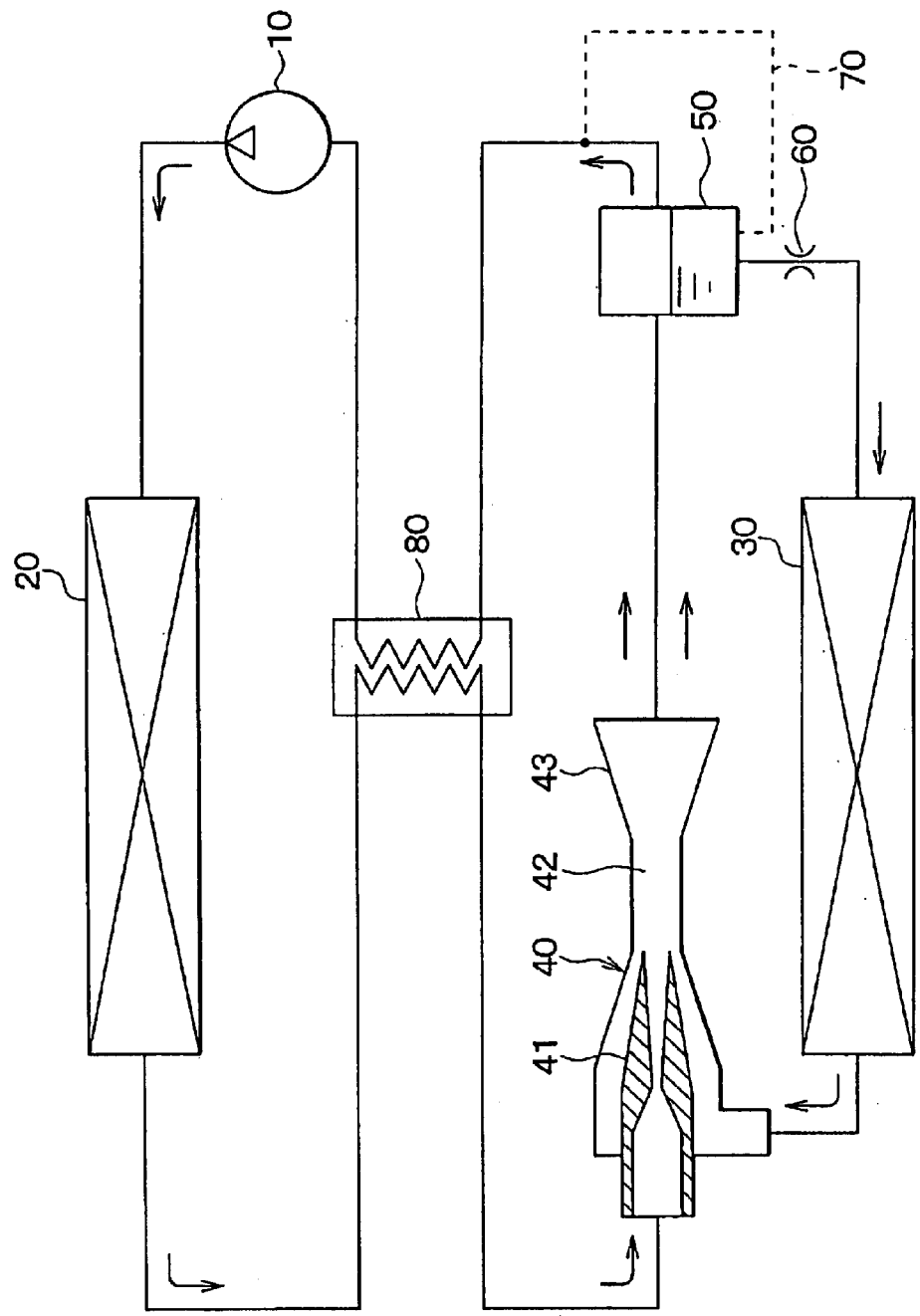
FIG. 1 is a schematic diagram showing an ejector cycle (vapor-compression refrigerant cycle) according to embodiments of the present invention.

In FIG. 1, a compressor 10 is disposed for sucking and compressing refrigerant circulated in the ejector cycle. The compressor 10 is driven by power from a vehicle engine for a vehicle running. A radiator 20 is a high-pressure heat exchanger for cooling high-temperature and high-pressure refrigerant discharged from the compressor 10 by performing heat-exchange operation between outside air and the high-temperature and high-pressure refrigerant. In the first embodiment, freon (fluorocarbon) can be used as the refrigerant. In this case, the pressure of refrigerant discharged from the compressor 10 becomes lower than the critical pressure of the refrigerant. However, the other refrigerant such as carbon dioxide can be used. When carbon dioxide is used as the refrigerant, the pressure of refrigerant discharged from the compressor 10 becomes higher than the critical pressure of the refrigerant.

Further, an evaporator 30 is a low-pressure heat exchanger for cooling air to be blown into a passenger compartment by evaporating liquid refrigerant, more specifically, by performing heat-exchange operation between the air and low-pressure refrigerant.

An ejector 40 sucks refrigerant evaporated in the evaporator 30 while decompressing and expanding refrigerant flowing out of the radiator 20 in a nozzle 41, and increases pressure of refrigerant to be sucked into the compressor 10 by converting expansion energy of the refrigerant to pressure energy of the refrigerant.

Refrigerant is discharged from the ejector 40, and flows into a gas-liquid-separator 50. The gas-liquid separator 50 separates the refrigerant from the ejector 40 into gas refrigerant and liquid refrigerant, and stores the separated gas refrigerant and the separated liquid refrigerant therein. A gas refrigerant outlet of the gas-liquid separator 50 is connected to a suction side of the compressor 10, and a liquid refrigerant outlet of the gas-liquid separator 50 is connected to a suction side of the evaporator 30. A throttle 60 is a decompression device for decompressing liquid refrigerant flowing out of the gas-liquid separator 50. In the first embodiment, a fixed throttle having a fixed opening degree such as an orifice and a capillary tube is used as the decompression device. However, a variable valve such as a thermal expansion valve can be used as the decompression unit (throttle 60). When the thermal expansion valve is used as the throttle 60, its throttle opening degree is controlled so that a superheating degree at a refrigerant outlet of the evaporator 30 becomes a predetermined value.

Further, an oil returning passage 70 is provided so that oil in the gas-liquid separator 50 is also introduced to the suction side of the compressor 10. In addition, an inner heat exchanger 80 is disposed to perform a heat exchange between low-pressure refrigerant to be sucked to the compressor 10 and high-pressure refrigerant flowing out of the radiator 20.

Figure 2:
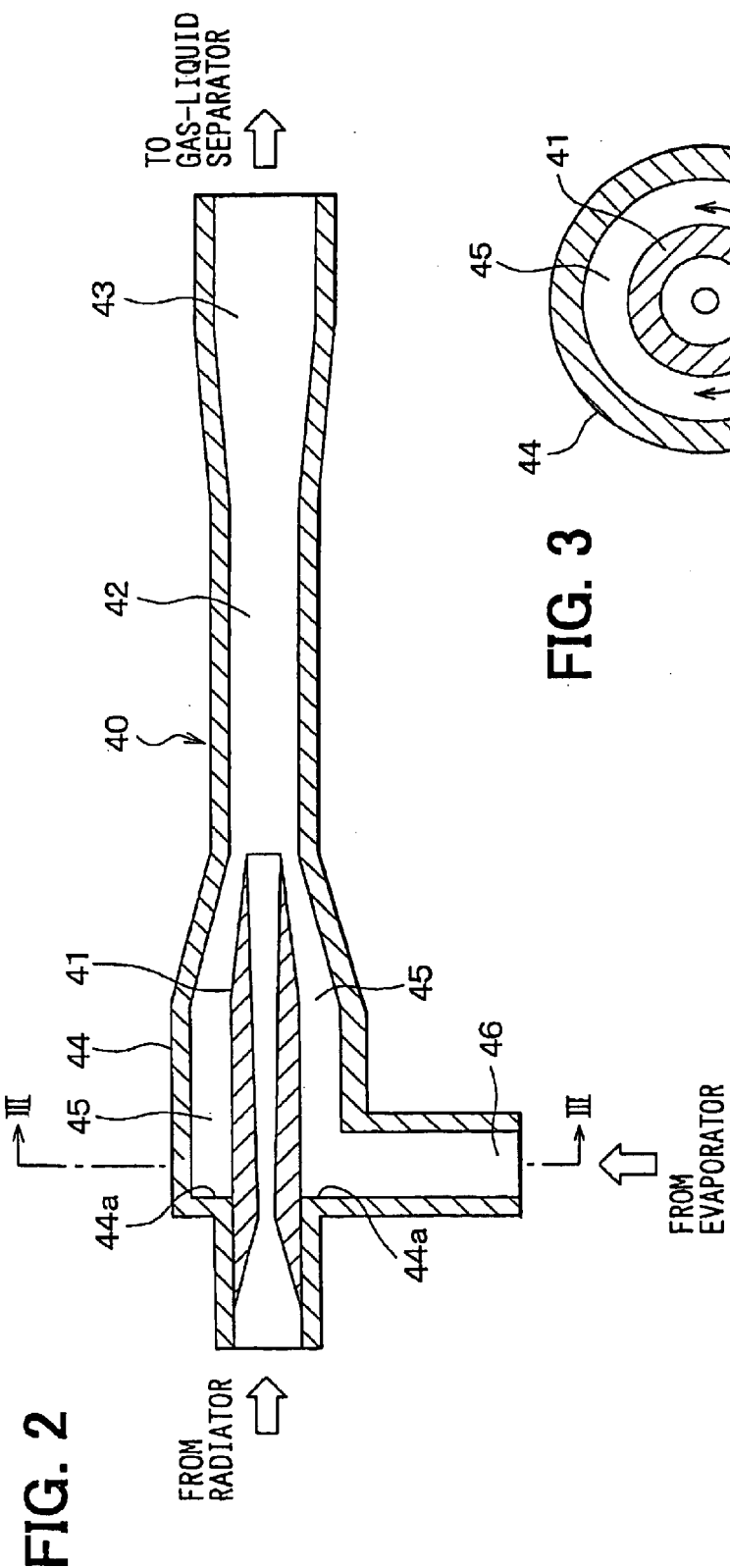
FIG. 2 is a schematic sectional view showing an ejector according to a first embodiment of the present invention.

Next, the ejector 40 will be now described with reference to FIG. 2. As shown in FIG. 2, the ejector 40 includes the nozzle 41, a mixing portion 42, and a diffuser 43. The nozzle 41 decompresses and expands high-pressure refrigerant flowing into the ejector 40 in isentropic by converting the pressure energy of the high-pressure refrigerant from the radiator 20 to the speed energy thereof. The mixing portion 42 sucks gas refrigerant evaporated in the evaporator 30 by using an entrainment function of high-speed refrigerant stream injected from the nozzle 41, while mixing the sucked refrigerant and the jetted refrigerant. Further, the diffuser 43 mixes the refrigerant jetted from the nozzle 41 and the refrigerant sucked from the evaporator 30, and increases the refrigerant pressure by converting the speed energy of the mixed refrigerant to the pressure energy thereof.

In the first embodiment, a "Laval nozzle" (refer to Fluid Engineering published by Tokyo University Publication) is adopted as the nozzle 41 to accelerate refrigerant jetted from the nozzle 41 to be equal to or higher than the sound velocity. The Laval nozzle includes a throttle having the smallest passage area in its refrigerant passage between a nozzle inlet and a nozzle outlet. However, a nozzle tapered toward its outlet can be used as the nozzle 41.

In the mixing portion 42, the drive stream of refrigerant from the nozzle 41 and the suction stream of the refrigerant sucked from the evaporator 30 are mixed so that their momentum sum is conserved, thereby increasing refrigerant pressure. In the diffuser 43, because a refrigerant passage sectional area gradually increases toward its outlet, the refrigerant speed energy (dynamic pressure) is converted to refrigerant pressure energy (static pressure). Thus, in the ejector 40, refrigerant pressure is increased by both of the mixing portion 42 and the diffuser 43. Accordingly, in the ejector 40, a pressure increasing portion is constructed with the mixing portion 42 and the diffuser 43.

The nozzle 41 is disposed in a housing 44 so as to form a refrigerant passage 45 between an outer periphery surface of the nozzle 41 and an inner wall surface of the housing 44. The housing 44 has a suction port 46 from which gas refrigerant in the evaporator 30 is sucked. The refrigerant passage 45 is formed in the housing 44 around the nozzle 41 to be concentric with the nozzle 41.

In the first embodiment, the nozzle 41 is fixed to the housing 44, and the suction port 46 is opened in a direction that is approximately perpendicular to an axial direction of the nozzle 41. A wall portion 44a is provided in the housing 44 to be continuously connected to an inner wall of the suction port 46. That is, the wall portion 44a is provided to prevent the refrigerant drawn from the suction port 46 from flowing to a refrigerant inlet side of the nozzle 41 in the axial direction of the nozzle 41. In FIG. 2, the wall portion 44a air-tightly contacts the outer periphery surface of the nozzle 41 so that a communication between the refrigerant passage 45 and the refrigerant inlet side of the nozzle 41 is shut.

Next, operation of the ejector cycle according to the first embodiment will be described.

When the compressor 10 operates, gas refrigerant from the gas-liquid separator 50 is sucked into the compressor 10, and the refrigerant compressed in the compressor 10 is discharged to the radiator 20. Then, refrigerant cooled in the radiator 20 is decompressed and expanded in iso-entropy in the nozzle 41 of the ejector 40, and refrigerant in the evaporator 30 is sucked into the ejector 40 by entrainment function of the refrigerant flow jetted from the nozzle 41.

Next, the refrigerant sucked from the evaporator 30 and the refrigerant jetted from the nozzle 41 are mixed in the mixing portion 42, and the dynamic pressure of the mixed refrigerant is converted to the static pressure thereof in the diffuser 43. Refrigerant discharged from an outlet of the diffuser 43 of the ejector 40 flows into the gas-liquid separator 50. On the other hand, because refrigerant in the evaporator 30 is drawn into the ejector 40, liquid refrigerant in the gas-liquid separator 50 is supplied to the evaporator 30 through the throttle 60. Liquid refrigerant supplied into the evaporator 30 is evaporated by absorbing heat from air to be blown into a compartment, so that air to be blown into the compartment is cooled.

Specifically, the jetted flow (drive flow) of refrigerant from the nozzle 41 reduces its flow speed while sucking and accelerating the refrigerant flow from the evaporator 30. In this case, the refrigerant discharged from the nozzle 41 and the refrigerant sucked from the evaporator 30 are mixed, so that the flow speed of the refrigerant sucked from the evaporator 30 becomes approximately equal to that of the refrigerant from the nozzle 41 at a refrigerant outlet portion of the mixing portion 42 (refrigerant inlet portion of the diffuser 43). The mixed refrigerant that is mixed in the mixing portion 42 flows into the diffuser 43, and the refrigerant pressure is increased in the diffuser 43 while the flow speed of the refrigerant is decreased. On the other hand, because gas refrigerant is sucked from the evaporator 30 into the ejector 40, liquid refrigerant from the gas-liquid separator 50 flows into the evaporator 30 to be evaporated by absorbing heat from air to be blown into the compartment.

Figure 4:
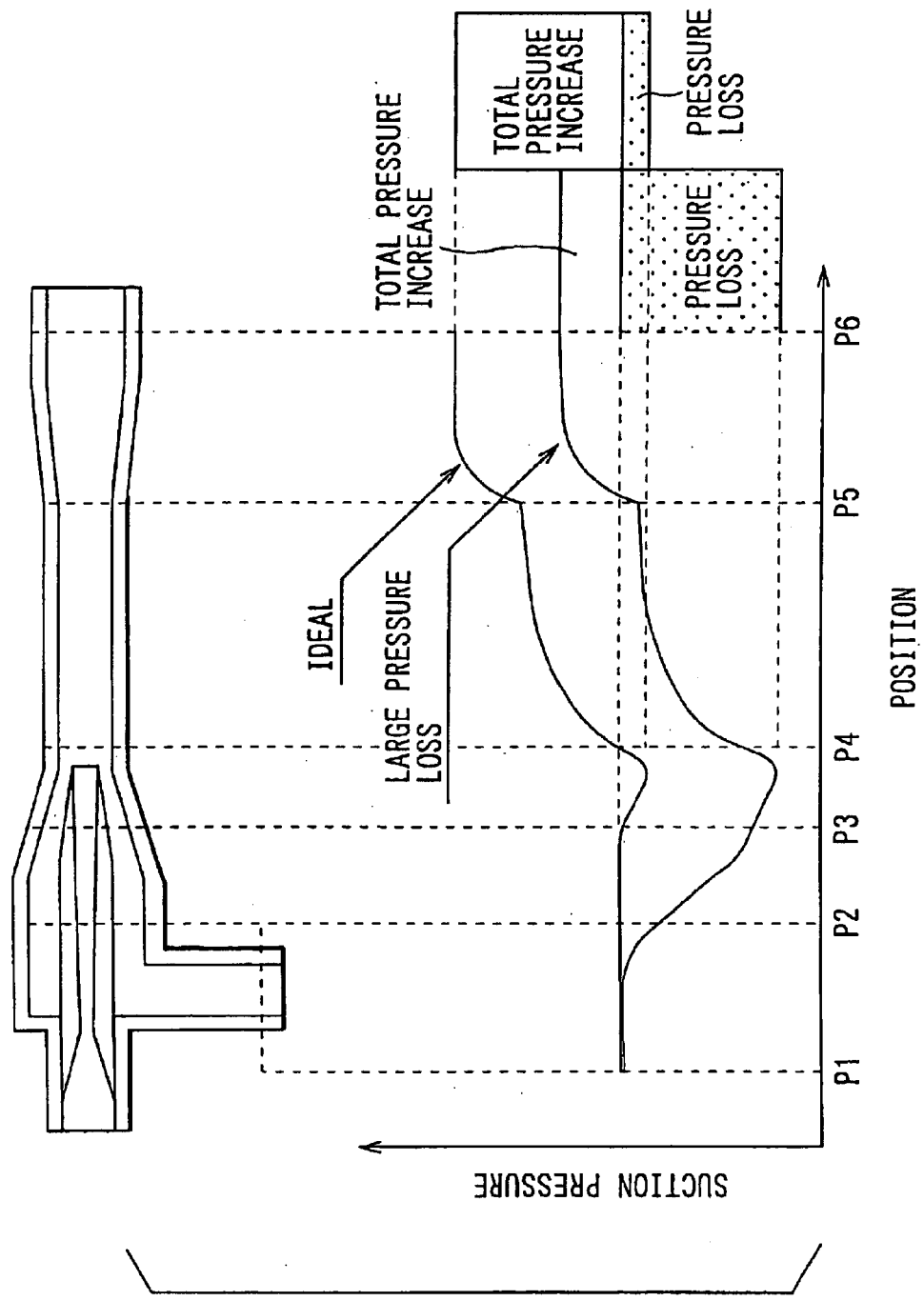
FIG. 4 is a graph showing a pressure change of a refrigerant sucked from the suction port 46, in an ideal ejector and in an ejector with a large pressure loss of suction refrigerant.
Figure 5:
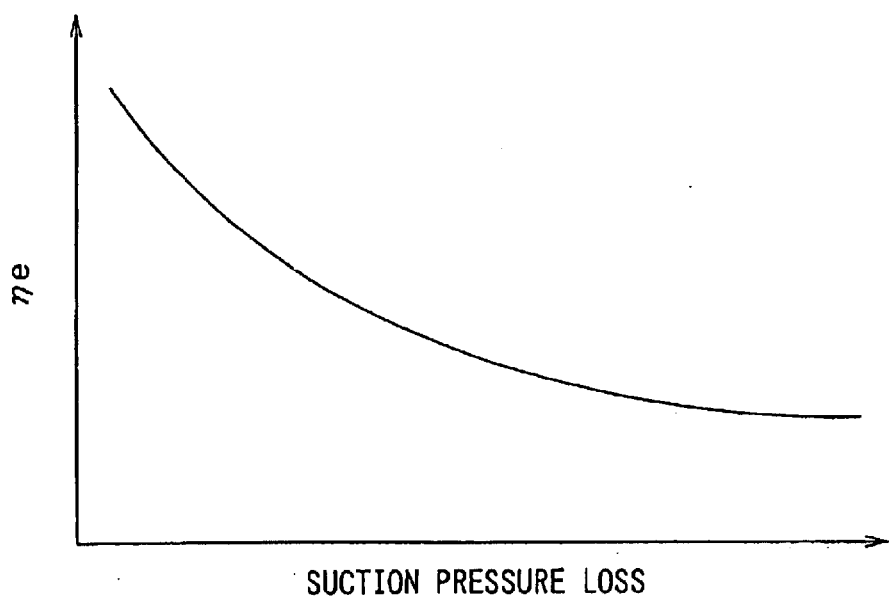
FIG. 5 is a graph showing a relationship between an ejector efficiency ($\eta e$) and a pressure loss (suction pressure loss) of suction refrigerant, according to the first embodiment.
Figure 6:
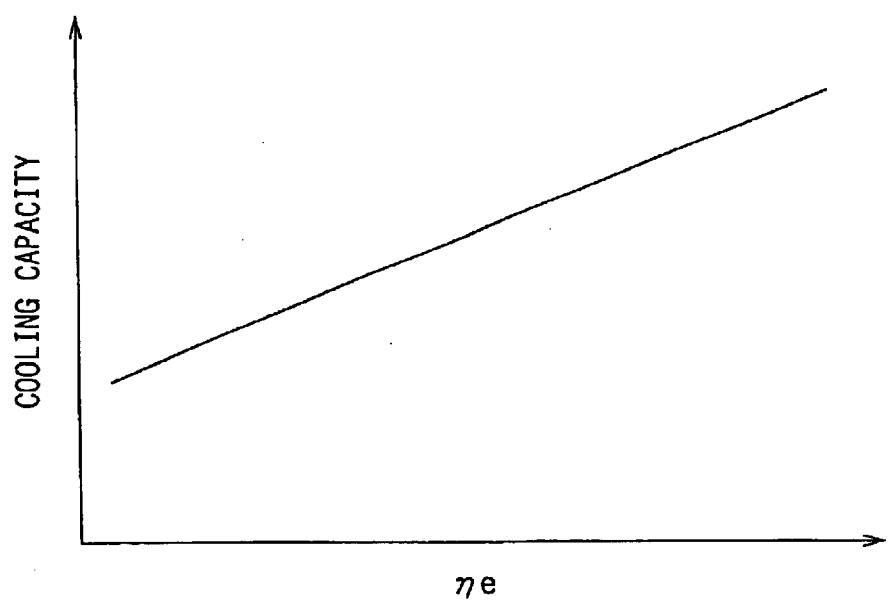
FIG. 6 is a graph showing a relationship between a cooling capacity and the ejector efficiency ($\eta e$), according to the first embodiment.

FIG. 4 shows a pressure change of refrigerant sucked from the suction port 46 in an ideal ejector, and a pressure change of suction refrigerant with a large pressure loss. As shown in FIG. 4, when a large pressure loss is generated in a refrigerant flow sucked from the suction port 46, a total increase amount (total pressure increase) of refrigerant in the ejector is decreased. In FIG. 4, P1–P6 show axial positions in the ejector. When the total increase amount of the refrigerant pressure in the ejector is decreased, ejector efficiency ηe is decreased. Accordingly, as shown in FIG. 5, when the large pressure loss is caused in the refrigerant flow sucked from the suction port 46, the ejector efficiency ηe is decreased, Further, a cooling capacity of the ejector cycle is decreased in accordance with the decrease of the ejector efficiency ηe.

The ejector efficiency ηe is defined as in the following formula (1).

$$\eta e=[\Delta P(Gn+Ge)/\rho g-Ge(Ue^2/2)]/(\Delta ie \cdot Gn)=[(Gn+Ge)\Delta ir-Ge(Ue^2/2)]/(\Delta ie \cdot Gn) \quad (1)$$

wherein, Δie is an enthalpy difference between a refrigerant inlet and a refrigerant outlet of the nozzle 41, Δir is an amount of refrigerant flowing into the radiator 20, Ge is an amount of refrigerant flowing into the evaporator 30, ΔP is a pressure increase amount of refrigerant to be sucked into the compressor 10, Ue is a suction flow speed of refrigerant in the ejector 40, and ρg is a suction-flow gas density of refrigerant in the ejector 40.

Figure 7:
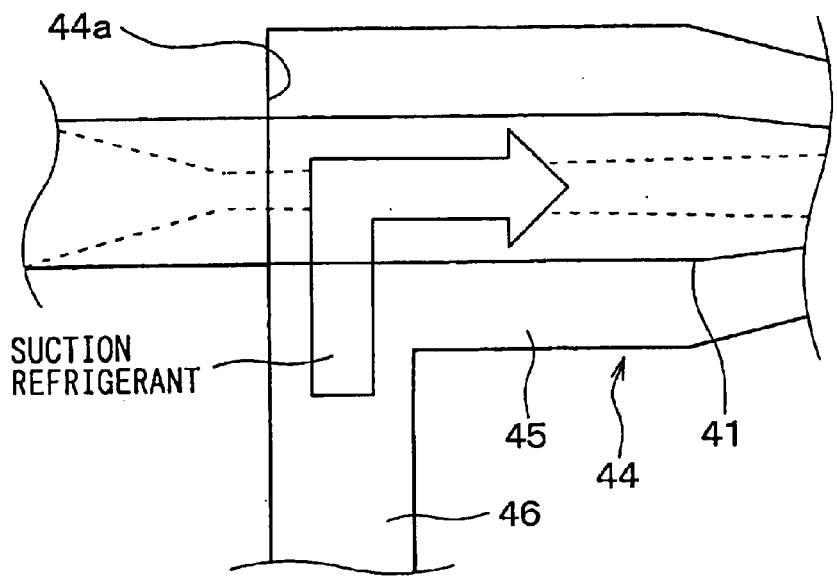
FIG. 7 is a schematic view showing a structure of the ejector according to the first embodiment.

In the first embodiment, as shown in FIG. 7, the wall portion 44a is formed to extend in a direction substantially perpendicular to an axial direction of the nozzle 41 at an end portion of the suction port 46, positioned at a most upstream side in the axial direction of the nozzle 41. That is, apart of an inner wall surface defining the suction port 46 is positioned in the same surface as an end portion of the wall portion 44a. Therefore, all of refrigerant introduced from the suction port 46 flows toward the refrigerant outlet side of the nozzle 41 by the wall portion 44a, without flowing toward the refrigerant inlet side of the nozzle 41 from the suction port 46 in the axial direction of the nozzle 41. Thus, it can prevent a large of pressure loss from being caused in the refrigerant sucked from the suction port 46. As a result, the ejector efficiency ηe can be sufficiently increased, thereby improving cooling capacity and coefficient of performance (COP) of the ejector cycle.

(Second Embodiment)

The second embodiment of the present invention will be now described with reference to FIG. 8. In the above-described first embodiment, the wall portion 44a is a flat plate substantially perpendicular to the axial direction of the nozzle 41. In contrast, in the second embodiment, a wall portion 44b is tilted relative to the axial direction, so that the refrigerant flowing into the refrigerant passage 45 from the suction port 46 is smoothly turned toward the refrigerant outlet side of the nozzle 41.

In the second embodiment, because refrigerant flowing into the refrigerant passage 45 from the suction port 46 can be smoothly turned toward the refrigerant outlet side, it can prevent a large pressure from being caused in the refrigerant sucked from the suction port 46.

Figure 8:
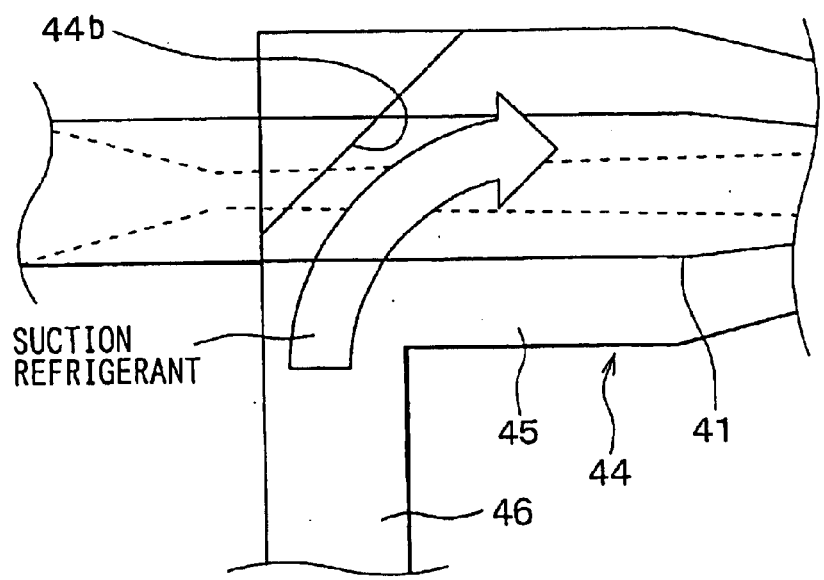
FIG. 8 is a schematic view showing a structure of an ejector according to a second embodiment of the present invention.

In the example shown in FIG. 8, the wall portion 44b is a flat plate tilted with respect to the axial direction of the nozzle 41. However, only when the wall portion 44b is formed to smoothly guide the refrigerant from the suction port 46 toward the refrigerant outlet side, the wall portion 44b can be formed in a curve shape such as a concave shape.

(Third Embodiment)

Figure 9:
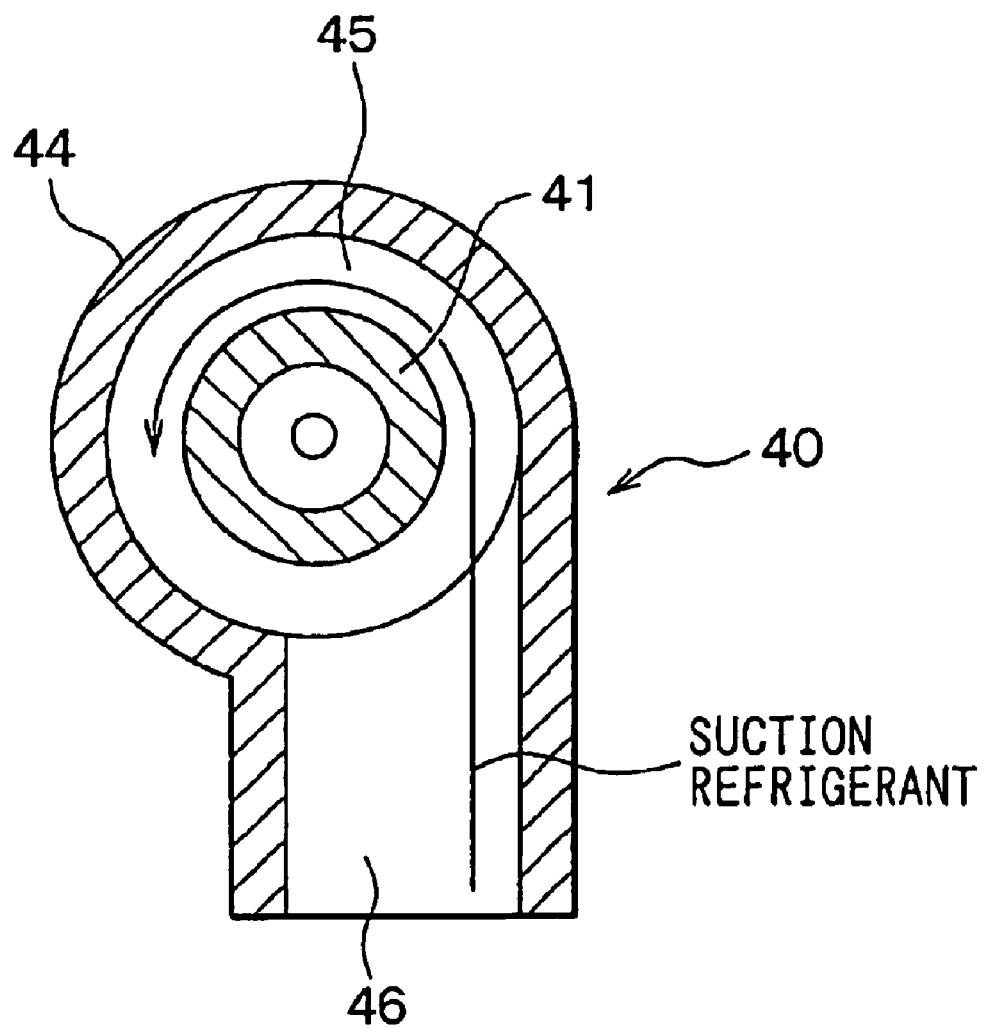
FIG. 9 is a schematic sectional view showing a structure of an ejector according to a third embodiment of the present invention.
Figure 10A:
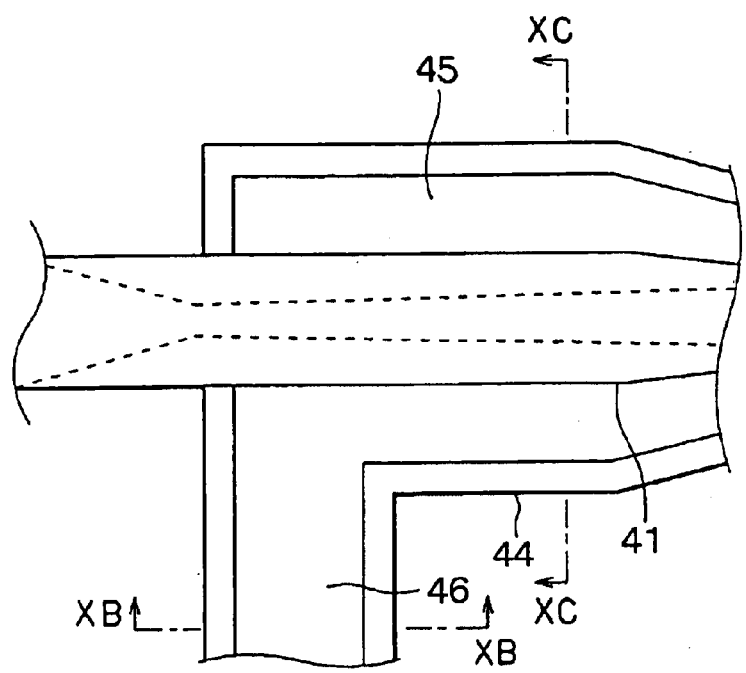
FIG. 10A is a schematic sectional view showing a part of an ejector according to a fourth embodiment of the present invention.
Figure 10B:
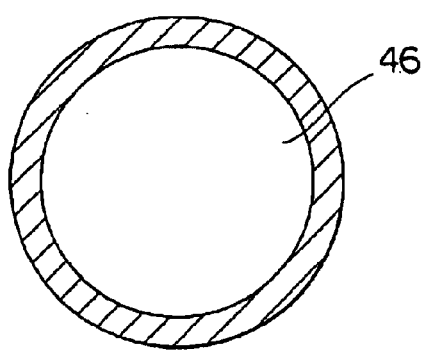
FIG. 10B is a cross-sectional view taken along line XB—XB in FIG. 10A.
Figure 10C:
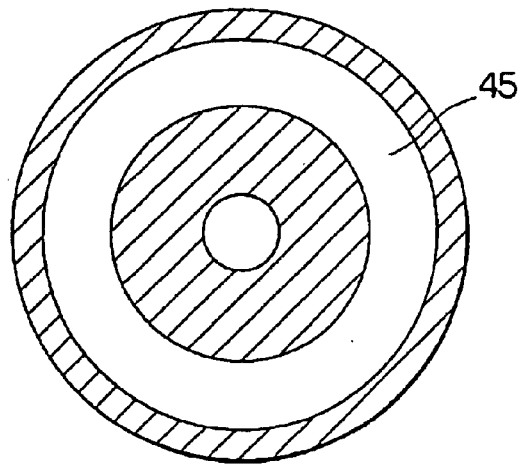
FIG. 10C is a cross-sectional view taken along line XC—XC in FIG. 10A.

The third embodiment of the present invention will be now described with reference to FIG. 9.

Figure 3:
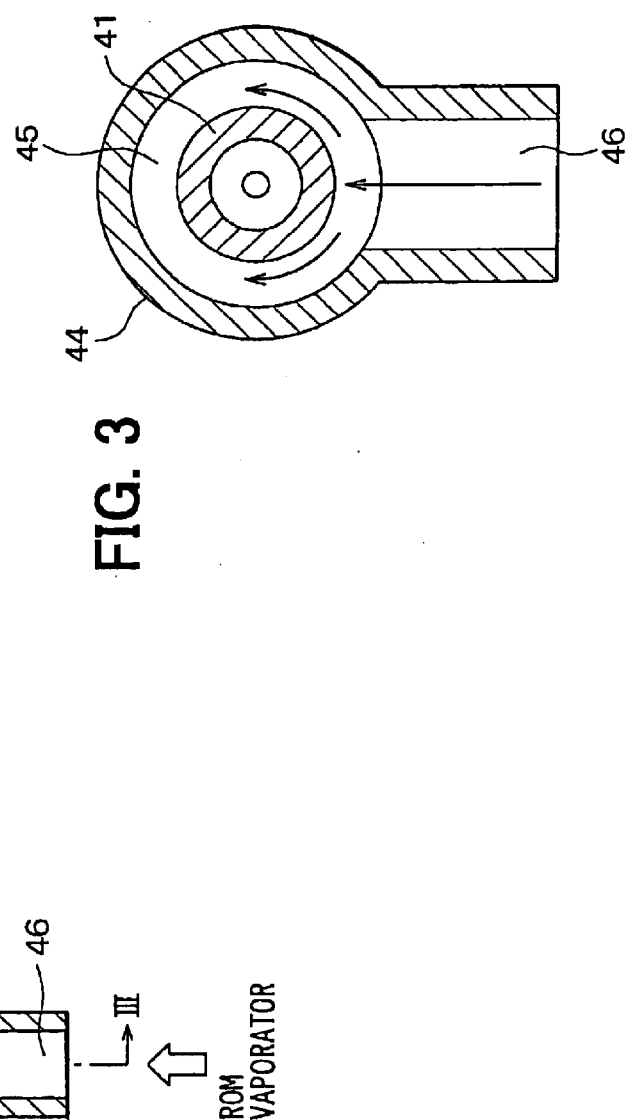
FIG. 3 is a cross-sectional view taken along line III—III in FIG. 2.

In the above-described first embodiment, as shown in FIG. 3, the suction port 46 is opened in a direction substantially perpendicular to the axial direction of the nozzle 41, and an axis of the suction port 46 is substantially lined with an axis of the nozzle 41. In contrast, in the third embodiment, as shown in FIG. 9, the suction port 46 is opened in a direction substantially in parallel with a direction perpendicular to the axial direction of the nozzle 41, while the axis of the suction port 46 is offset from the axis of the nozzle 41. Thus, it can prevent refrigerant flowing into the refrigerant passage 45 from the suction port 46 from colliding with an outer surface of the nozzle 41, thereby preventing a large pressure loss from being caused in the suction refrigerant.

In the third embodiment, the axis of the suction port 46 is offset from the axis of the nozzle.41 by a predetermined dimension so that refrigerant flowing from the suction port 46 can smoothly introduced into and flows through the refrigerant passage 45 around the nozzle 41. Therefore, the refrigerant flowing into the refrigerant passage 45 from the suction port 46 is turned around the nozzle 41, and the flow direction of the refrigerant is changed toward the refrigerant outlet side of the nozzle 41.

In the third embodiment, the wall portion 44a of the first embodiment or the wall portion 44b of the second embodiment can be provided. In this case, the advantages described in the first and second embodiments can be obtained.

(Fourth Embodiment)

The fourth embodiment of the present invention will be now described with reference to FIGS. 10A to 12. In the fourth embodiment, a ratio (B/A) of a passage sectional area B of the refrigerant passage 45 to a passage sectional area A of the suction port 46 is made optimal, so that it can prevent a large pressure loss from being caused in the suction refrigerant. Here, the passage sectional area A of the suction port 46 is the area of the suction port shown in FIG. 10B, and the passage sectional area B of the refrigerant passage 45 is the area of the refrigerant passage 45 shown in FIG. 10C.

In the fourth embodiment, the structure of the ejector 40 can be made similarly to that of the first embodiment, or can be made similarly to that of the second embodiment. Alternatively, the structure of the ejector 40 can be made similarly to that of the third embodiment.

The sectional area ratio A/B of the passage sectional area B of the refrigerant passage 45 to the passage sectional area A of the suction port 46 is set so that the pressure loss of the suction refrigerant becomes smaller, an oil returning amount to the compressor 10 becomes larger and the system performance such as the cooling capacity becomes larger.

Figure 11:
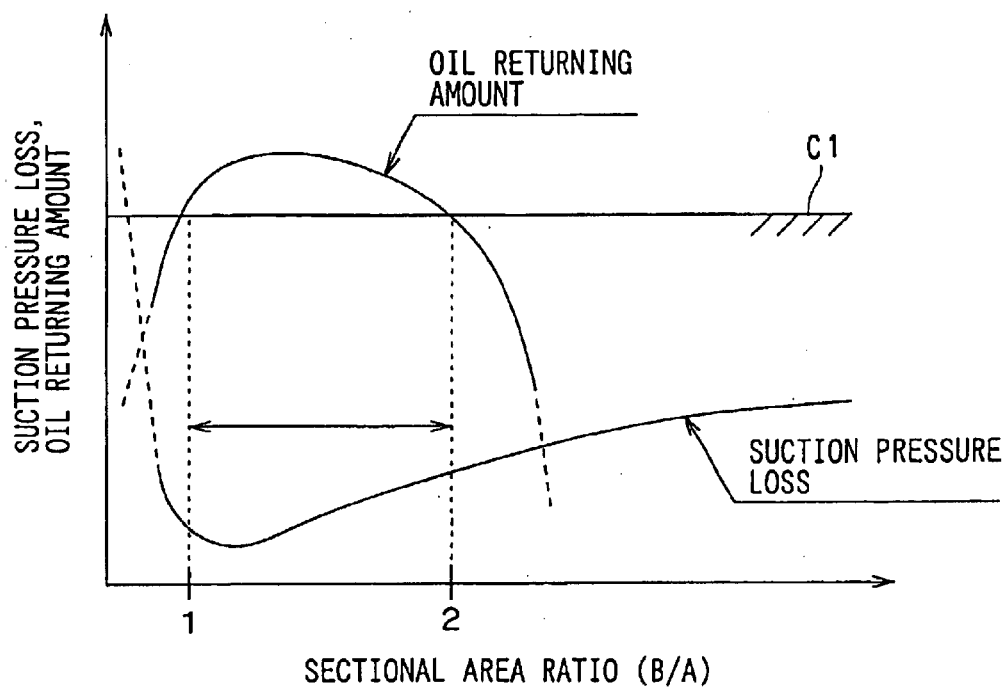
FIG. 11 is a graph showing a relationship between a sectional area ratio (B/A), a suction pressure loss and an oil returning amount, according to the fourth embodiment.

FIG. 11 shows a relationship between the sectional area ratio B/A, and the pressure loss of the suction refrigerant and the oil returning amount to the compressor 10. In FIG. 11, R404A is used as the refrigerant. As shown in FIG. 11, when the sectional area ratio B/A is smaller than 1, the refrigerant passage 45 at a side of the suction port 46 becomes in a throttle state. In this case, the pressure loss of the suction refrigerant is extremely increased, and the oil returning amount to the compressor 10 is greatly reduced. When the sectional area ratio B/A is larger than 2, a whirl flow is caused in the housing 44, and pressure loss of the suction refrigerant is increased.

When the pressure loss of the suction refrigerant is increased, refrigerant is not sufficiently drawn from the evaporator 30. As a result, oil stays in the evaporator 30 and pipes, and a certain amount of oil is not returned to the compressor 10. In this case, the compressor 10 may be damaged, and the system performance of the ejector cycle, such as the cooling performance, is deteriorated. As shown in FIG. 11, when the sectional area ratio is in a range between 1 and 2, the pressure loss of the suction refrigerant can be sufficiently reduced, and the oil returning amount to be returned to the compressor 10 can be set to be larger than a necessary amount C1. When the oil returning amount to the compressor 10 is smaller than the necessary amount, the compressor 10 may be damaged.

Figure 12:
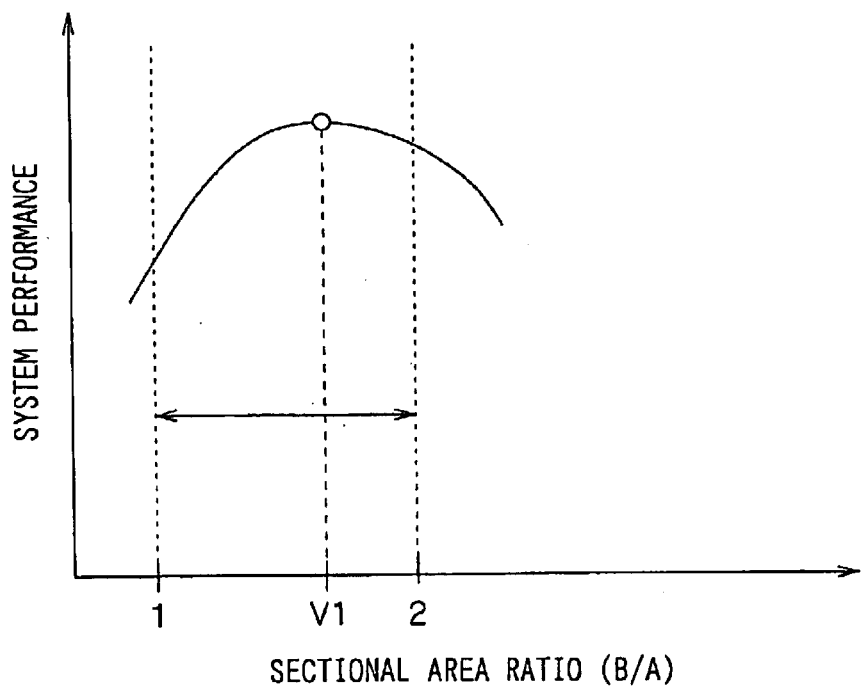
FIG. 12 is a graph showing a relationship between the sectional area ratio (B/A) and a system performance, according to the fourth embodiment.

FIG. 12 shows a relationship between the sectional area ratio B/A and the system capacity such as the cooling capacity. As shown in FIG. 12, when the sectional area ratio B/A is set at an optimum value V1 in the range between 1 and 2, the cooling capacity, that the system performance of the ejector cycle can be made maximum. The system performance includes the COP that is a ratio of a predetermined capacity to a necessary power.

According to experiments by the inventors of the present application, in a small refrigerant cycle having a small capacity, even when the sectional area ratio B/A is increased to 3, the system performance can be set in a necessary level. Thus, in this case, the sectional area ratio B/A can be set in a range of 1 and 3.

In the ejector cycle of a vehicle air conditioner where R404A is used as the refrigerant, when the sectional area ratio B/A is set in the ratio of 1.0 and 2.0, the system performance can be sufficiently improved. Preferably, the sectional area ratio B/A is set in the ratio of 1.0 and 1.8.

More preferably, the sectional area ratio B/A is set in the ratio of 1.2 and 1.5. In this case, the system performance of the ejector cycle can be further improved.

Although the present invention has been fully described in connection with the preferred embodiments thereof with reference to the accompanying drawings, it is to be noted that various changes and modifications will become apparent to those skilled in the art.

For example, in the above embodiments, the ejector cycle according to the present invention is typically used for the vehicle air conditioner. However, the ejector cycle of the present invention can be used for a vapor compression refrigerator using a cold such as a showcase, or can be used for a vapor-compression refrigerant cycle using a heat such as a hot-water supply unit or a heating unit.

In the above-described embodiments, the throttle opening degree of the nozzle 41 is fixed. However, the present invention can be applied to an ejector cycle having a variable ejector where the nozzle throttle opening degree can be changed.

In the above-described first embodiment, the wall surface 44a is perpendicular to the axial direction of the nozzle. However, the wall surface 44a can be formed to be tilted from a perpendicular direction perpendicular to the axial direction of the nozzle 41 toward the outlet side of the nozzle 41 from a part of the suction port. Even in this case, the wall portion 44a can be crossed with the axial direction of the nozzle 41.

In the above-described embodiments of the present invention, the present invention is applied to the ejector cycle having the inner heat exchanger 80. However, the present invention can be applied to an ejector cycle without the inner heat exchanger.

Such changes and modifications are to be understood as being within the scope of the present invention as defined by the appended claims.

What is claimed is:

1. An ejector comprising:

a nozzle in which a driving fluid flow is throttled and is accelerated by converting pressure energy to speed energy;

a housing which receives the nozzle to define a passage portion around the nozzle, the housing having a suction port from which a fluid is sucked by entrainment of a high-speed flow of driving fluid jetted from the nozzle, and a pressure increasing portion in which the fluid sucked from the suction port and the driving fluid jetted from the nozzle are mixed while a pressure of the fluid is increased by converting the speed energy to the pressure energy; and a wall portion, which is provided in the housing, to prevent the fluid drawn from the suction port into the passage portion from flowing toward an inlet side of the nozzle from a position of the suction port in an axial direction of the nozzle, wherein the housing has an inner wall surface for defining the suction port, and a part of the inner wall surface is positioned in the same surface as an end portion of the wall portion.

2. The ejector according to claim 1, wherein:

the suction port is opened in a direction crossing with an axial direction of the nozzle; and the wall portion is tilted with respect to the axial direction such that a flow of the fluid flowing into the passage portion from the suction port is turned toward an outlet side of the nozzle.

3. The ejector according to claim 2, wherein the suction port is opened in a direction substantially perpendicular to the axial direction of the nozzle.

4. The ejector according to claim 1, wherein:
the suction port is opened to have an axis that is substantially parallel with a direction perpendicular to an axis of the nozzle; and
the axis of the suction port is offset from the axis of the nozzle.

5. The ejector according to claim 1, wherein:
the suction port and the passage portion are set in such a manner that a ratio of a passage sectional area (B) of the passage portion to a passage sectional area (A) of the suction port is in a range between 1 and 2.

6. An ejector comprising:
a nozzle in which a driving fluid flow is throttled and is accelerated by converting pressure energy to speed energy; and
a housing which receives the nozzle to define a passage portion around the nozzle, the housing having a suction port from which a fluid is sucked by entrainment of a high-speed flow of driving fluid jetted from the nozzle, and a pressure increasing portion in which the fluid sucked from the suction port and the driving fluid jetted from the nozzle are mixed while a pressure of the fluid is increased by converting the speed energy to the pressure energy, wherein:
the suction port is opened to have a central axis that is substantially parallel with a direction perpendicular to a central axis of the nozzle; and
the central axis of the suction port is linearly offset from the central axis of the nozzle such that the central axis of the suction port does not intersect with the central axis of the nozzle.

7. An ejector for a vapor compression refrigerant cycle in which R404A is used as refrigerant, the ejector comprising:
a nozzle in which a driving refrigerant flow is throttled and is accelerated by converting pressure energy to speed energy; and
a housing which receives the nozzle to define a refrigerant passage portion around the nozzle, the housing having a suction port from which a refrigerant is sucked by entrainment of a high-speed flow of driving refrigerant jetted form the nozzle, and a pressure increasing portion in which the refrigerant sucked from the suction port and the driving refrigerant jetted from the nozzle are mixed while a pressure of the refrigerant is increased by converting the speed energy to the pressure energy,
wherein a ratio of a passage sectional area (B) of the refrigerant passage portion to a passage sectional area (A) of the suction port is in a range between 1 and 2.

8. The ejector according to claim 7, wherein the ratio of the passage sectional area (B) of the refrigerant passage portion to the passage sectional area (A) of the suction port is in a range between 1 and 1.8.

9. The ejector according to claim 8, wherein the ratio of the passage sectional area (B) of the refrigerant passage portion to the passage sectional area (A) of the suction port is in a range between 1.2 and 1.5.

* * * * *